United States Patent
Courjaud

(10) Patent No.: US 9,525,264 B2
(45) Date of Patent: Dec. 20, 2016

(54) SYSTEM AND METHOD FOR GENERATING A BURST OF ULTRA-SHORT, HIGH-POWER LASER PULSES

(71) Applicant: AMPLITUDE SYSTEMES, Pessac (FR)

(72) Inventor: Antoine Courjaud, Leognan (FR)

(73) Assignee: AMPLITUDE SYSTEMES, Pessac (FR)

( * ) Notice: Subject to any disclaimer, the term of this patent is extended or adjusted under 35 U.S.C. 154(b) by 12 days.

(21) Appl. No.: 14/649,752

(22) PCT Filed: Dec. 4, 2013

(86) PCT No.: PCT/FR2013/052947
§ 371 (c)(1),
(2) Date: Oct. 7, 2015

(87) PCT Pub. No.: WO2014/087104
PCT Pub. Date: Jun. 12, 2014

(65) Prior Publication Data
US 2016/0064892 A1 Mar. 3, 2016

(30) Foreign Application Priority Data
Dec. 4, 2012 (FR) .................................. 12 61628

(51) Int. Cl.
*H01S 3/10* (2006.01)
*H01S 3/23* (2006.01)
(Continued)

(52) U.S. Cl.
CPC ......... *H01S 3/10023* (2013.01); *H01S 3/0813* (2013.01); *H01S 3/0816* (2013.01);
(Continued)

(58) Field of Classification Search
CPC .................. H01S 3/10007; H01S 3/10023
See application file for complete search history.

(56) References Cited

U.S. PATENT DOCUMENTS

| | | |
|---|---|---|
| 5,434,875 A | 7/1995 | Rieger et al. |
| 7,508,847 B2 * | 3/2009 | Honninger ............ H01S 3/1115 372/39 |

(Continued)

FOREIGN PATENT DOCUMENTS

| | | |
|---|---|---|
| WO | 2008016287 A1 | 2/2008 |
| WO | 2009103313 A1 | 8/2009 |

OTHER PUBLICATIONS

International Search Report, dated Jun. 23, 2014, from corresponding PCT application.

*Primary Examiner* — Eric Bolda
(74) *Attorney, Agent, or Firm* — Young & Thompson

(57) ABSTRACT

A system and method for generating a burst of ultra-short, high-power laser pulses, the system includes elements for generating laser pulses having a repetition period $\tau_1$, amplification elements including an optical amplifier medium, a regenerative optical cavity, elements for injecting the laser pulses into the regenerative optical cavity, and elements for extracting the laser pulses from the regenerative optical cavity. The regenerative optical cavity has a total length such that the duration of a round trip of each pulse is between $N-1$ and $N$ times the period $\tau_1$, wherein $N$ is an integer higher than or equal to 2, the injection elements are adapted for trapping a burst of $N$ laser pulses in the regenerative optical cavity, the extraction elements are suitable to extract the burst of $N$ laser pulses from the regenerative optical cavity, and the optical amplifier medium is suitable for forming a burst of amplified laser pulses.

15 Claims, 3 Drawing Sheets

Figure 1:
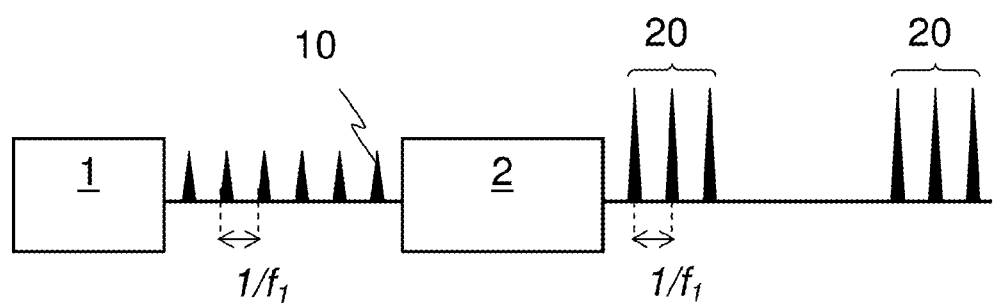

(51) Int. Cl.
*H01S 3/00* (2006.01)
*H01S 3/081* (2006.01)
*H01S 3/107* (2006.01)
*H01S 3/11* (2006.01)
*H01S 3/06* (2006.01)

(52) U.S. Cl.
CPC ............... *H01S 3/107* (2013.01); *H01S 3/11* (2013.01); *H01S 3/2325* (2013.01); *H01S 3/005* (2013.01); *H01S 3/0057* (2013.01); *H01S 3/0604* (2013.01)

(56) References Cited

U.S. PATENT DOCUMENTS

| | | | |
|---|---|---|---|
| 2006/0018349 A1* | 1/2006 | Kopf | H01S 3/235 |
| | | | 372/30 |
| 2011/0182306 A1* | 7/2011 | Hosseini | B23K 26/0624 |
| | | | 372/25 |
| 2011/0206071 A1* | 8/2011 | Karavitis | A61F 9/0084 |
| | | | 372/25 |
| 2011/0206073 A1* | 8/2011 | Karavitis | H01S 3/0057 |
| | | | 372/25 |
| 2012/0212804 A1* | 8/2012 | Sarkisyan | H01S 3/2325 |
| | | | 359/342 |
| 2012/0213236 A1 | 8/2012 | Lundquist et al. | |
| 2012/0243565 A1 | 9/2012 | Onose et al. | |
| 2015/0288134 A1* | 10/2015 | Danielius | H01S 3/08054 |
| | | | 372/12 |

* cited by examiner

SYSTEM AND METHOD FOR GENERATING A BURST OF ULTRA-SHORT, HIGH-POWER LASER PULSES

The present invention generally relates to the ultra-short, high-power pulse laser. More precisely, the invention relates to a method and a system for generating bursts of high-power laser pulses.

Laser amplifiers are optical systems comprising a spatially-confined, optically-pumped amplifying structure, and an optical system allowing to bring and adapt the propagation of the laser beam to be amplified to the gain volume available in the amplifying structure. During the propagation of the laser beam to be amplified in the amplifying structure, a transfer of energy is performed, coherently, between the energy stored in the amplifying structure and the energy of the beam: it is the stimulated emission. This transfer is performed in competition with an incoherent process, called spontaneous emission.

The quantity of energy transferred from the amplifying structure to the laser beam depends on parameters linked to the laser beam and to the characteristics of the amplifying structure.

As a function of the parameters of the laser beam and of the amplifying medium, the transfer of energy may not be optimal after only one beam traverse. In this case, it is interesting that the laser beam performs a number of traverses in the same amplifying structure to extract optimally the energy stored in the amplifying medium.

Different simple geometric configurations are known, which are used to perform a reduced number (2 to 8) of passages of the beam in the amplifying structure, by angular or polarization multiplexing. The multi-passage configuration may be optimized as a function of the different parameters of the beam (size, divergence) and of the aspect ratio of the amplification volume (length to diameter).

For a higher number of beam passages, or for a high aspect ratio, a regenerative amplifier is used, which comprises a regenerative cavity. The regenerative cavity includes mirrors ensuring the rigorously identical propagation of the beam in the cavity: it is talked about stable cavity. Moreover, an active component allows to inject a beam at a given instant, to keep the beam in the cavity so that the energy thereof is progressively amplified as the beam performs passages in the amplifying medium. The active component is usually an electro-optic cell, called Pockels cell, but may also be an acousto-optical element.

The efficiency of the amplifying system is measured by the ratio between the energy extracted by the laser beam and the energy stored in the amplifying medium. This efficiency of extraction depends on the ratio between the intrinsic gain of the amplifying medium and the losses undergone by the beam in the regenerative cavity, such losses coming from the imperfection of the mirrors used and of the transmissive or reflective components, such as polarizer, Pockels cell . . . .

The extracted fluence $J_{Lext}$ may then be expressed as a function of the saturation fluence $J_{Lsat}$, the stored fluence $J_{Lsto}$, the number of passages $k_L$ in the amplifying medium, and the total reflectivity R of the cavity.

A regenerative cavity has for advantage to allow a very high number of passages in the amplifying medium. However, a regenerative cavity presents a limitation due to the losses introduced by the elements constituting the optical gate (polarizer and Pockels cell), as well as in the dimensions of these components, limited by the technology.

In certain applications, for example in a scientific instrument such as a synchrotron, it is desired to generate a burst of two to one thousand of laser pulses, each pulse burst having a determined energy of the order of the milli-Joule and the pulses of a burst being at a frequency of the order of one hundred of Hertz.

In the present document, it is understood by "burst of laser pulses" a series of at least two laser pulses, two successive pulses of one burst being emitted at a regular time interval corresponding to a first frequency, and two successive bursts being emitted at a time interval corresponding to a second frequency. In the following of the present document, the following terms are used as equivalent: pulse burst, pulse train, series of pulses or macropulse (multibunch or burst).

It is known from the document WO2009/103313A1 a laser pulse burst generator, based on a regenerative amplifier and a Pockels cell. This device allows to trap an initial laser pulse in a resonant optical cavity and to extract a fraction of the initial laser pulse at each passage on the Pockels cell so as to generate a pulse burst at a second frequency higher than the frequency of the initial laser pulses. This device requires a fine synchronization of the Pockels cell with respect to each round trip of the pulse in the secondary cavity, the stability in energy of each pulse depends directly on the time drift of the device synchronization signals. The pulses of a burst are emitted at a high frequency and require an accurate adjustment of the cavity length when it is desired to synchronize these pulses to an external electronic reference. Moreover, it is a device coming in addition to the initial pulse laser, with its own efficiency and stability.

One of the objects of the invention is to generate a burst of laser pulses forming a high-energy macropulse, at a relatively low burst rate (a few tens to a few hundreds of Hertz), in a simplified and more efficient architecture.

The present invention has for object to remedy these drawbacks.

The invention relates to a system for generating a burst of ultra-short, high-power laser pulses comprising means for generating laser pulses at a first repetition frequency f1 and a repetition period $\tau 1$ equal to the inverse of the first repetition frequency f1 amplification means comprising an optical amplifying medium, a regenerative optical cavity, means for injecting said laser pulses into said regenerative optical cavity and means for extracting said laser pulses from said regenerative optical cavity.

According to the invention, the regenerative optical cavity has such a total length that the duration of round trip of each pulse in said regenerative optical cavity is comprised between N−1 and N times the repetition period $\tau 1$ of the generation means of said laser pulses, where N is an integer higher than or equal to two, said injection means being adapted to trap a burst of N laser pulses in said regenerative optical cavity, said extraction means being adapted to extract said burst of N laser pulses from said regenerative optical cavity and said optical amplifying medium being adapted to amplify said burst of N laser pulses and to form a burst of amplified laser pulses.

The invention allows to generate a burst of amplified laser pulses that are perfectly synchronized with the frequency of generation of the initial pulses.

Advantageously, the regenerative optical cavity includes an optical system with a unitary matrix.

According to various aspects of embodiments of the system:

said injection means and the extraction means include a Pockels cell configured so as to be fully blocking between the injection of the pulse burst and the extraction of said pulse burst;

the regenerative optical cavity is a multi-passage cavity and the amplifying medium is arranged in said multi-passage regenerative optical cavity so that one pulse of the pulse burst performs a plurality of passages through the amplifying medium;

said regenerative optical cavity comprises a first concave mirror of radius of curvature R, and a second concave mirror of radius of curvature R/2, the distance between the first mirror and the second mirror being equal to R and the distance between the first mirror and the optical amplifying medium being equal to R;

the regenerative optical cavity is a multi-passage cavity including an optical system with mirrors arranged in such a manner that the beam incident on each of said mirrors is spatially offset at each passage in said multi-passage cavity;

the amplifying medium is arranged inside said regenerative optical cavity.

According to a particular embodiment, said optical amplifying medium operates in reflection.

In another embodiment, said optical amplifying medium operates in transmission, said regenerative optical cavity further comprising a third concave mirror of radius of curvature R, a fourth concave mirror of radius of curvature R/2, the distance between the third mirror and the fourth mirror being equal to R and the distance between the third mirror and the optical amplifying medium being equal to R.

The invention also relates to a method for generating a burst of ultra-short, high-power laser pulses comprising the following steps:

generating laser pulses at a first repetition frequency f1 and a repetition period τ1 equal to the inverse of the first repetition frequency f1 injecting said laser pulses into a regenerative optical cavity of a regenerative amplifier, the regenerative optical cavity has such a total length that the duration of a round trip of each pulse in said regenerative optical cavity is comprised between N−1 and N times the period τ1 of the means for generating said laser pulses, where N is an integer higher than or equal to two;

trapping a burst of N laser pulses in said regenerative optical cavity;

extracting said burst of N laser pulses from said regenerative optical cavity, and optically amplifying said burst of N laser pulses to form a burst of amplified laser pulses.

The invention will find a particularly advantageous application in the generation of a burst of ultra-short, high-power laser pulses.

The present invention also relates to the characteristics that will become apparent from the following description and that will have to be considered in isolation or according to any of their technically possible combinations.

Figure 2:
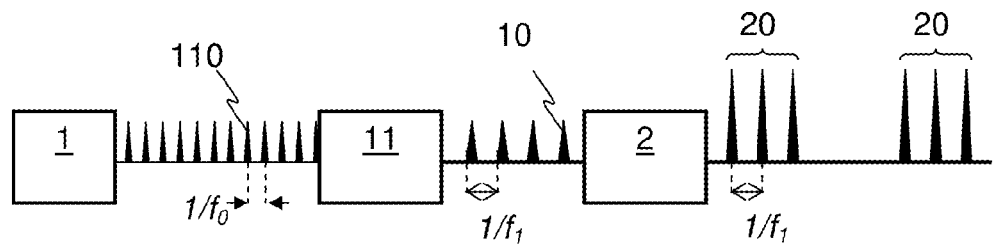
Figure 3:
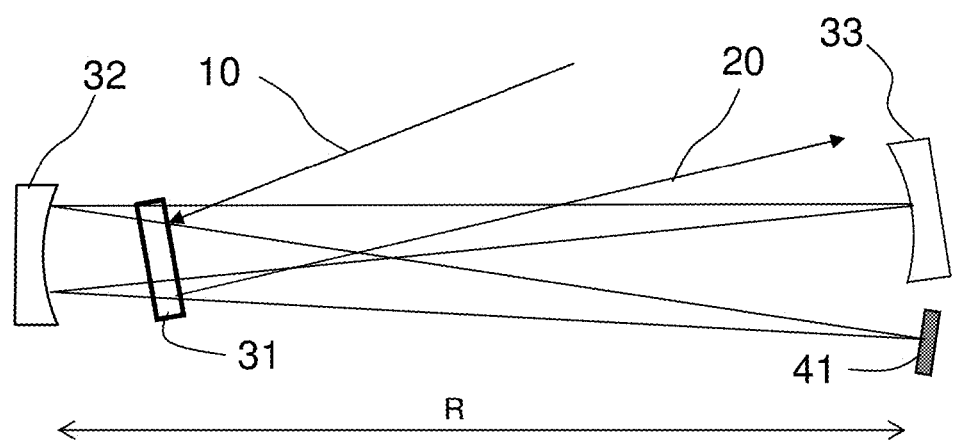
Figure 4A:
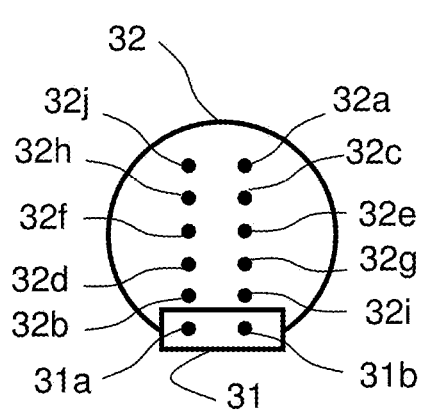
Figure 4B:
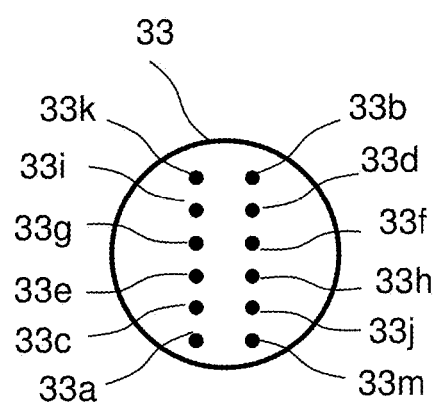
Figure 5:
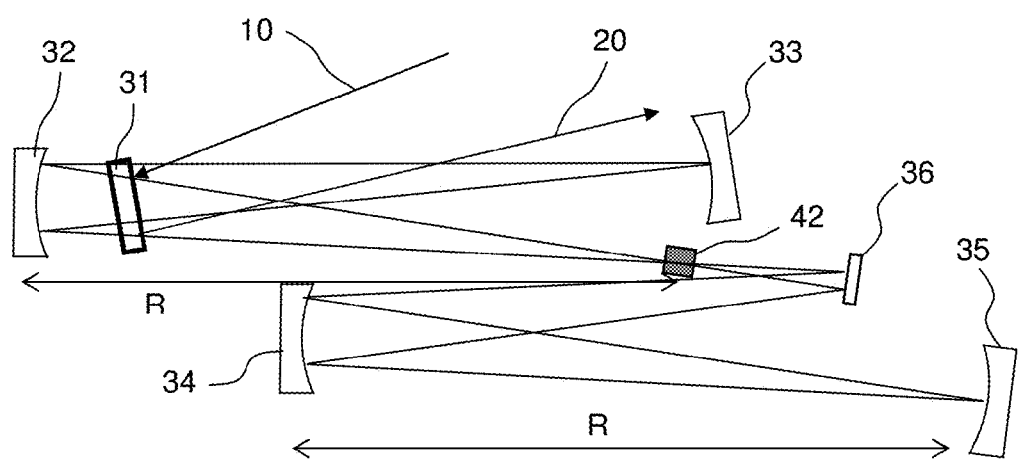
Figure 6A:
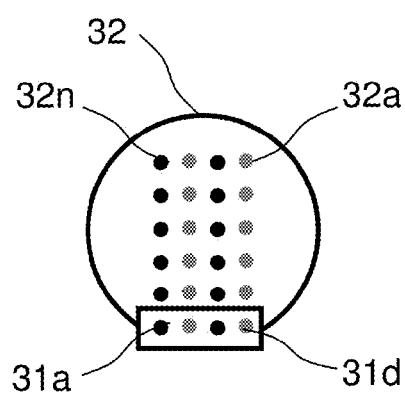
Figure 6B:
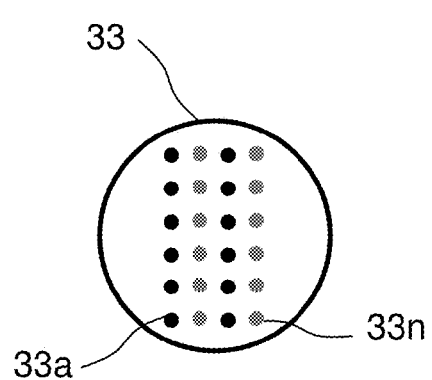

The present description, given only by way of non-limitative example, will allow to better understand how the invention may be performed with reference to the appended drawings, in which:

FIG. 1 schematically shows a generator of high-power laser pulse bursts according to a first embodiment of the invention;

FIG. 2 schematically shows a generator of high-power laser pulse bursts according to a variant of the first embodiment of the invention;

FIG. 3 schematically shows a first exemplary embodiment of a multi-passage cavity of a regenerative amplifier comprising an optical amplifying medium operating in reflection;

FIG. 4A schematically shows a front view of two mirrors of the multi-passage cavity of FIG. 3, as well as the offset of a laser beam on these two mirrors at each passage in the cavity; FIG. 4B schematically shows a front face of another mirror of the multi-passage cavity of FIG. 3, as well as the offset of a laser beam on this other mirror at each passage in the cavity;

FIG. 5 schematically shows a second exemplary embodiment of a multi-passage cavity of a regenerative amplifier comprising an optical amplifying medium operating in transmission;

FIG. 6A schematically shows a front view of two mirrors of the multi-passage cavity of FIG. 5, as well as the offset of a laser beam on these two mirrors at each passage in the cavity; FIG. 6B schematically shows a front face of another mirror of the multi-passage cavity of FIG. 5, as well as the offset of a laser beam on this other mirror at each passage in the cavity.

FIG. 1 shows a system for generating bursts of laser pulses. The system includes a pulse oscillator 1 and a regenerative amplifier 2.

The pulse oscillator 1 generates laser pulses 10 at a repetition frequency hereinafter called first frequency f1. In other words, the laser pulses 10 are emitted successively with a period τ1 equal to 1/f1. The first frequency $f_1$ is generally comprised between 50 MHz and 1 GHz. The frequency f1 of the oscillator 1 is chosen as a function of the required application. Advantageously, the pulse oscillator 1 is rate synchronized to an external clock rate. The laser pulses 10 have a duration generally comprised between 20 fs and 10 ps and a spectral width of 0.1 to 50 nm.

Generally, the regenerative amplifier 2 includes a gain optical amplifying medium and an optical cavity, called a regenerative cavity, generally formed of mirrors. Preferably, in order to ensure the stability of the regenerative cavity, the latter includes an optical arrangement constituting a unitary matrix, in which an optical beam may propagate a number of times equal to K, where K is an integer higher than or equal to 1, according to the desired elongation for the regenerative cavity and the dimension of the beams with respect to the size of the mirrors. The optical arrangement of the regenerative cavity with a unitary matrix may be passive or include the optical amplifying medium. In the case where the optical amplifying medium is inside the regenerative cavity, the gain of the regenerative cavity is also improved as the power of K.

The system also includes means for injecting and extracting the laser pulses into and from the regenerative cavity. The regenerative cavity is configured in such a manner that its length is comprised between N−1 and N times the length of the oscillator cavity, i.e. the duration of a round trip of each pulse in the regenerative cavity is comprised between N−1 and N times the period τ1 of the oscillator train, where N is an integer higher than or equal to two.

The system operates as follows: the injection means introduce laser pulses 10 into the regenerative cavity. N pulses circulate continuously in the regenerative cavity, when the Pockels cell is inactive. As soon as the Pockels cell is activated, the N pulses are trapped in the regenerative cavity, undergoing an amplification at each round trip. The regenerative amplifier amplifies the burst of N pulses, the energy of amplification being distributed between the N pulses. Then, the extraction of the burst of the N amplified pulses out of the resonating cavity is triggered by switching back the Pockels cell to the inactive mode. A burst of N amplified pulses is hence obtained, the pulses of the burst being always at the first repetition frequency f1. The frequency of triggering of the pulse extraction means determines a second frequency between two bursts of amplified laser pulses 20. The second frequency f2 is far lower than the first repetition frequency f1.

When the period of the oscillator train is lower than the time of rising and decrease of the Pockels cell, a fast modulator is hence available to inject the burst of N required pulses.

The maximum number of pulses of the pulse burst trapped in the regenerative cavity is determined by the length of the regenerative cavity and by the first frequency f1.

Hence, for a frequency f1 of the oscillator, a linear cavity of length L will allow to produce bursts of N pulses, such that: N=c/2/n/L/f1, with c the speed of light, n the refraction index of the medium of propagation of the pulses.

By way of non-limitative example, the length in the regenerative cavity may reach 150 linear meters, which allows for example to produce a pulse burst having a total duration of 1 μs, wherein the burst may comprise, according to the needs, 1000 pulses spaced by 1 ns (oscillator with a first frequency f1 equal to 1 GHz) or 50 pulses spaced by 20 ns (oscillator with a first frequency f1 equal to 50 MHz).

Advantageously, the length of the amplifying cavity may be easily modified, for example by modifying the alignment of the unitary matrix. The modification of the cavity length hence allows to modify the number of pulses of the pulse burst. For example, a same reconfigurable regenerative cavity allows to cover a range from 1 pulse to 32 pulses, only by the alignment of two mirrors, in a same space.

It is however noted that the energy of the macropulse remains identical whatever the number of pulses in the macropulse, for a given amplifier, the energy of the macropulse being distributed among the different pulses constituting a pulse burst.

This flexibility in macropulse length may in particular be very appreciated by the accelerator community, which more and more uses the pulse burst regime.

Furthermore, this burst regime has many advantages in terms of architecture, with respect to the management of the energy extraction and the management of the non-linearities. Indeed, the energy extracted is distributed over N pulses, hence pushing back the limits in term of extraction of the macropulse energy. This allows in particular to exploit more efficiently optical amplifying materials having a low-gain, i.e. having a high saturation fluence, such as Yb:CaF$_2$ or Yb:glass, or also other rare earths. In terms of management of the non-linearities, N pulses reduce in proportion the self-phase modulation, allowing to significantly reduce the required rate of elongation of the pulses.

Hence, for example, a laser intended to deliver 100 mJ in single-pulse femtosecond regime requires a time stretching of 3 ns to limit the effects of the self-phase modulation. A laser based on the same amplifying material but operating in pulse burst regime requires only a time stretching of 3 ps for a same energy of 100 mJ distributed over 16 pulses.

Particularly advantageously, the injection means and the rejection means include an electro-optic cell of the electrically controlled Pockels cell type, the Pockels cell being arranged at the entry-exit of the regenerative amplifier.

The prior systems and methods that use a regenerative amplifier are configured so as to trap only one pulse in the regenerative cavity, and to amplify only one pulse at a time. Hence, the document WO2009/103313A1 describes a system in which a single initial pulse is trapped, then a portion of the initial pulse is extracted at each passage in the regenerative cavity to form a burst of several pulses at a frequency higher than the initial frequency. On the contrary, the system of the invention traps simultaneously several initial pulses and forms a burst including as many pulses at the exit as the number of pulses trapped in the regenerative cavity, the pulses of a burst being at the same frequency as the frequency of the trapped pulses.

In the case where the rate of the oscillator 1 is lower than 100 MHz, the time of response of the Pockels cell used in the regenerative amplifier is sufficient to select the laser pulse burst 10 to be injected (cf. FIG. 1).

FIG. 2 illustrates a variant of the system for generating amplified laser pulses. The device includes an oscillator 1 that generates pulses 110 at a frequency f0 higher than 100 MHz. The system includes means 11 for the fast selection of the laser pulse burst 10 to be amplified upstream from the injection into the regenerative amplifier 2. Advantageously, the selection means 11 of the pulse burst 10 include an ultra-fast electro-optic modulator, based for example on a wave-guide Mach-Zender interferometer, initially developed in the field of communications.

In an advantageous embodiment, not shown, the device for generating bursts of laser pulses further includes a time stretching device and a time compression device. Preferentially, the time stretching device is placed between the oscillator 1 and the regenerative amplifier 2, and the time compression device is placed at the exit of the regenerative amplifier 2. The time stretching and time compression devices are for example based on one or several diffraction grating(s), prisms, chirped volume Bragg grating (s) or chirped Bragg grating (s) inscribed in a fiber.

The regenerative amplifier includes a multi-passage cavity. Advantageously, the number of passages of the beam in the multi-passage cavity is adjustable so as to optimize the total length of the cavity to the number of pulses required in the macropulse (burst).

According to a preferred embodiment, the gain amplifying medium is integrated in the multi-passage cavity so as to ensure that the time of amplification in the regenerative cavity remains far lower than the time of fluorescence of the amplifying material.

Among the advantages of the pulse burst generation system, it will be noted, on the one hand, that the higher the number of pulses constituting the macropulse, the less it is required to stretch the pulses to avoid the non-linear effects, and on the other hand, the less the fluence per pulse is critical with respect to the fluence of damage of the optical components forming the regenerative cavity.

The architecture of the amplification system allows to greatly simplify the architecture of the laser, while having pulses that are all perfectly synchronous with a same electric reference at the first repetition frequency f1.

The system of the invention may be easily adapted on a pulse laser operating in single-pulse regime, to transform it into a laser operating in laser pulse burst regime.

The pulse generator allows to respond to new applications, in particular in the scientific instruments such as a particle accelerator, for which the electron acceleration systems are rate limited by RF power modules, the klystrons, currently limited to 100 Hz. Hence, a pulse burst laser allows to better exploit certain later materials optimized for the operation at a relatively low rate, from a few tens to a few hundreds of Hertz. The generator of laser pulse burst allows in particular a better energy extraction at this rate, while offering an optimum pulse-to-pulse energy stability.

FIGS. 3 to 6 illustrate examples of multi-passage and low-loss amplifiers, which are particularly adapted for the generation of laser pulses and in particular bursts of laser pulses as described in the first part of the present description.

FIG. 3 schematically shows a first exemplary embodiment of a multi-passage cavity for a regenerative amplifier comprising an optical amplifying medium 41 operating in reflection. The multi-passage cavity includes an injection and extraction mirror 31, a first mirror 32, a second mirror 33 and an optical amplifying medium 41 operating in reflection. The reflection optical amplifying medium 41 includes for example a planar laser crystal of a disc-shaped laser medium (slab laser). The optical amplifying medium 41 is optically pumped by a pump beam, which is not shown. Advantageously, the injection and extraction mirror 31 is a planar mirror, the first mirror 32 and the second mirror 33 are concave mirrors. Preferably, the first concave mirror 32 has a radius of curvature equal to R, the second concave mirror 33 has a radius of curvature equal to R/2, the distance between the first concave mirror 32 and the second concave mirror 33 is equal to R and the distance between the first concave mirror 32 and the optical amplifying medium 41 is also equal to R. Hence, the high-power laser pulse beam is never focused on the surface of one of the mirrors 31, 32 or 33.

The angles of orientation of the mirrors 31, 32, 33 and of the optical amplifying medium 41 are determined so that an optical beam entering at one point on the injection and extraction mirror 31 travels at least two times in the multi-passage cavity, before exiting the multi-passage cavity by the same injection and extraction mirror 31.

For example in FIG. 3, a laser pulse beam 10 is directed towards the injection and extraction mirror 31, which reflects the laser pulse beam 10 towards the optical amplifying medium 41. The optical amplifying medium 41 reflects this beam of laser pulses amplified a first time towards the first mirror 32. The first mirror 32 reflects this beam of laser pulses amplified a first time towards the second mirror 33. The second mirror 33 reflects this beam of laser pulses amplified a first time towards the first mirror 32. The first mirror 32 reflects again the beam of laser pulses amplified a first time towards the optical amplifying medium 41. The optical amplifying medium 41 reflects this beam of laser pulses amplified twice toward the injection and extraction mirror 31. A beam 20 of laser pulses amplified twice is then extracted.

The multi-passage cavity of FIG. 3 has the advantage that it allows an overlap of the beam amplified a first time and of the beam amplified a second time on the optical amplifying medium 41. Particularly advantageously, the optical amplifying medium 41 includes a reflective treatment so as to reduce the losses of the multi-passage cavity.

The number N of points of reflection of the laser beam on the mirrors 32 and 33 depends on the adjustment of the mirror 31 and of the laser crystal 41, and then corresponds to N/2 reflections on the laser crystal 41, hence N traverses through the amplifying medium 41.

By way of illustrative example, FIGS. 4A and 4B show a front view of the injection and extraction mirror 31 and of the first mirror 32, and respectively the second mirror 33 in a multi-passage cavity, such as that of FIG. 3, as well as the offset of the point of reflection of a laser beam on these mirrors 31, 32, 33 at each passage in the multi-passage cavity.

The laser pulse beam 10 is injected into the multi-passage cavity and is incident on the injection and extraction mirror 31 at one point 31a. It is reflected in the multi-passage cavity on the amplifying medium 41, then is incident on the first mirror 32 at the point 32a. The laser beam is directed towards the second mirror 33 and is incident on this second mirror 33 at a first point 33a. The beam is then reflected towards the first mirror 32 at one point 32b and so on by the second mirror 33 at the point 33b . . . up to be reflected towards the injection and extraction mirror 31. During the passage on the first mirror 32, the laser pulse beam is incident on the first mirror 32 successively at the points 32a, 32b, 32c . . . up to the point 32i. The points 32a, 32b, . . . 32i are offset on the surface of the first mirror 32. Likewise, during the passage on the second mirror 33, the laser pulse beam is incident on the second mirror 33 successively at the points 33a, 33b, 33c, . . . up to the point 33m. The points 33a, 33b, . . . 33m are offset on the surface of the second mirror 33. On the other hand, the laser beam is always collimated when it is incident on the surface of the amplifying medium 41.

When the laser beam includes a burst of pulses, each mirror 31, 32, 33 is exposed to the fluence of one pulse at a time. Now, the repetition frequency f1 of the pulses of a burst is relatively low, which allows to reduce the risks of damage of the mirrors 31, 32, 33 exposed to the laser beam.

FIG. 5 schematically shows a second exemplary embodiment of a multi-passage cavity for a regenerative amplifier comprising an optical amplifying medium 42 operating in transmission. The same components carry the same reference signs as in FIG. 3. The multi-passage cavity includes an injection and extraction mirror 31, a first mirror 32, a second mirror 33 and an optical amplifying medium 42 operating in transmission. The multi-passage cavity further includes a third mirror 34 and a fourth mirror 35. Advantageously, the multi-passage cavity also includes a fold-back mirror 36. The transmission optical amplifying medium 42 includes for example a laser crystal. The optical amplifying medium 42 is optically pumped by a pump beam, which is not shown. Advantageously, the injection and extraction mirror 31 and the fold-back mirror 34 are planar mirrors; the first mirror 32, the second mirror 33, the third mirror 34 and the fourth mirror 35 are concave mirrors. Preferably, the first concave mirror 32 and the third concave mirror 34 have a radius of curvature equal to R, the second concave mirror 33 and the fourth mirror 35 have a radius of curvature equal to R/2. The distance between the first concave mirror 32 and the second concave mirror 33 is equal to R and the distance between the first concave mirror 32 and the optical amplifying medium 42 is also equal to R. Symmetrically, the distance between the third mirror 34 and the fourth mirror 35 is equal to R and the distance between the third concave mirror 34 and the optical amplifying medium 42 is also equal to R.

The angles of orientation of the mirrors 31, 32, 33 and the optical amplifying medium 41 are determined so that an optical beam 10 entering at one point on the injection and extraction mirror 31 travels at least twice in the multi-passage cavity, before exiting from the multi-passage cavity by the same injection and extraction mirror 31 and forms an exit laser beam 20.

For example in FIG. 5, a laser pulse beam 10 is directed towards the injection and extraction mirror 31, which reflects the laser pulse beam 10 towards the optical amplifying medium 42. The optical amplifying medium 42 transmits this beam of laser pulses amplified a first time towards the fold-back mirror 36, then of the third mirror 34. The third mirror 34 reflects this beam of laser pulses amplified a first time towards the fourth mirror 35. The fourth mirror 35 reflects this beam of laser pulses amplified a first time towards the third mirror 34. The third mirror 34 reflects again the beam of laser pulses amplified a first time towards the fold-back mirror 36 then towards the optical amplifying medium 42. The optical amplifying medium 42 transmits this beam of laser pulses amplified twice towards the injection and extraction mirror 31. A beam 20 of laser pulses amplified twice is then extracted.

The multi-passage cavity of FIG. 5 has the advantage that it allows an overlap of the beam amplified a first time and of the beam amplified at least a second time through the optical amplifying medium 42. The laser beam always passes at the point in the optical amplifying medium 42.

The number N of points of reflection of the laser beam on the mirrors 32, 33, 34 and 35 depends on the adjustment of the mirrors of the multi-passage cavity and then corresponds to N traverses through the amplifying medium 42.

The points on the mirrors 32 and 33 (symmetrically on the mirrors 34 and 35) may follow the scheme illustrated in FIGS. 4A and 4B.

The multi-passage cavity of FIG. 3 or of FIG. 5 has the advantage that it is easily modifiable, to pass from a pair number N to a pair number N' of traverses through the amplifying medium, provided that the dimensions of the mirrors with respect to the beam sizes allow it.

Besides, the system allows to guarantee an identical beam size in the crystal, with a point of overlap of the beams at the centre of the crystal.

As illustrated in FIGS. 6A and 6B, it is possible to increase the number of points on the mirrors 32, 33 by means of a secondary system of imaging according to another axis (horizontal in FIGS. 6A and 6B) to produce a lateral offset of the points shown in grey.

FIGS. 6a and 6B show a front view of the injection and extraction mirror 31 and of the first mirror 32, and respectively second mirror 33, of a multi-passage cavity such as that of FIG. 3 or of FIG. 5, as well as the offset of the point of reflection of a laser beam on these mirrors 31, 32, 33 (by symmetry on the mirrors 34 and 35 in the case of the cavity of FIG. 5) at each passage in the multi-passage cavity.

The laser pulse beam 10 is injected in the multi-passage cavity and is incident on the injection and extraction mirror 31 at one point 31a. It is reflected in the multi-passage cavity on the amplifying medium 41, then is incident on the first mirror 32 at the point 32a. The laser beam is directed towards the second mirror 33 and is incident on this second mirror 33 at a first point 33a. The beam is then reflected towards the first mirror 32 at one point 32b and so on by the second mirror 33 at the points 33b . . . 33n up to being reflected towards the injection and extraction mirror 31, at the point 31d. During the passage on the first mirror 32, the laser pulse beam is incident on the first mirror 32 successively at the points 32a, 32b, 32c, . . . up to the point 32n. The points 32a, 32b, . . . 32n are offset on the surface of the first mirror 32. Likewise, during the passage on the second mirror 33, the laser pulse beam is incident on the second mirror 33, successively at the points 33a, 33b, 33c, . . . , up to the point 33n. The points 33a, 33b, . . . , 33n are offset on the surface of the second mirror 33. On the other hand, the laser beam is always collimated when it is incident on the surface of the amplifying medium 42.

When the laser beam includes a pulse burst, each mirror 31, 32, 33, 34, 35, 36 is exposed to the fluence of one pulse at a time, which allows to reduce the risks of damage of these mirrors when they are exposed to the laser beam.

The multi-passage cavities, illustrated in FIGS. 3 and 5, allow to have a regenerative cavity of great length while having a reduced size. Advantageously, the optical mirror system allows to fold back the optical path of the pulses in the cavity, without introducing losses. Such a cavity allows to trap a burst of laser pulses to amplify them in a same amplifying medium 41 or 42. These cavities hence allow to generate a burst of amplified pulses as soon as they are generated. The energy stored in the amplifying medium is distributed between the pulses of a pulse burst. The frequency of the laser pulses of one burst is hence equal to their initial frequency at the entry of the multi-passage cavity. The pulses of a same burst are synchronized with a clock, for example the reference clock of the oscillator. Moreover, the pulses of successive bursts also remain synchronized with this reference clock.

One or several additional stages of amplification may be arranged at the exit of the regenerative cavity.

The invention claimed is:

1. A system for generating a burst of ultra-short, high-power laser pulses (20), comprising:
   means (1, 11) for generating laser pulses (10) at a first repetition frequency f1 and a repetition period $\tau$1 equal to the inverse of the first repetition frequency f1;
   amplification means (2) comprising an optical amplifying medium (41, 42), a multi-passage regenerative optical cavity, means for injecting said laser pulses (10) into said regenerative optical cavity, and means for extracting said laser pulses from said regenerative optical cavity,
   wherein:
   the regenerative optical cavity has such a total length that the duration of a round trip of each pulse in said regenerative optical cavity is comprised between N−1 and N times the repetition period $\tau$1 of the generation means (1, 11) of said laser beams (10), where N is an integer higher than or equal to two,
   said injection means are adapted to trap a burst of N laser pulses (10) in said regenerative optical cavity,
   said extraction means are adapted to extract said burst of N laser pulses from said regenerative optical cavity, and
   the amplifying means is arranged inside said regenerative optical cavity, said optical amplifying medium (41, 42) is adapted to amplify said burst of N laser pulses and to form a burst of amplified laser pulses (20).

2. The system for generating a burst of laser pulses according to claim 1, wherein said regenerative optical cavity includes an optical system with a unitary matrix.

3. The system for generating a burst of laser pulses according to claim 1, wherein said injection means and said extraction means include a Pockels cell configured so as to be fully blocking between the injection of the pulse burst and the extraction of said pulse burst.

4. The system for generating a burst of laser pulses according to claim 1, wherein the regenerative optical cavity is a multi-passage cavity and wherein the amplifying medium is arranged in said multi-passage regenerative optical cavity so that one pulse of the pulse burst performs a plurality of passages through the amplifying medium.

5. The system for generating a burst of laser pulses according to claim 4, wherein said regenerative optical cavity comprises a first concave mirror (32) of radius of curvature R, and a second concave mirror (33) of radius of curvature R/2, the distance between the first mirror (32) and the second mirror (33) being equal to R and the distance between the first mirror (32) and the optical amplifying medium (41, 42) being equal to R.

6. The system for generating a burst of laser pulses according to claim 4, wherein said optical amplifying medium (41) operates in reflection.

7. The system for generating a burst of laser pulses according to claim 4, wherein said optical amplifying medium (42) operates in transmission, said regenerative optical cavity further comprising a third concave mirror (34) of radius of curvature R, a fourth concave mirror (35) of radius of curvature R/2, the distance between the third mirror (34) and the fourth mirror (35) being equal to R and the distance between the third mirror (34) and the optical amplifying medium (42) being equal to R.

8. The system for generating a burst of laser pulses according to claim 4, wherein the regenerative optical cavity is a multi-passage cavity including an optical system with mirrors (31, 32, 33, 34, 35, 36) arranged in such a manner that the beam incident on each of said mirrors (31, 32, 33, 34, 35, 36) is spatially offset at each passage in said multi-passage cavity.

9. A method for generating a burst of ultra-short, high-power laser pulses (20) comprising the following steps:
- generating laser pulses (10) at a first repetition frequency f1 and a repetition period τ1 equal to the inverse of the first repetition frequency f1;
- injecting said laser pulses (10) into a regenerative optical cavity of a regenerative amplifier, the regenerative optical cavity has such a total length that the duration of a round trip of each pulse in said regenerative optical cavity is comprised between N−1 and N times the period τ1 of the means (1, 11) for generating said laser pulses (10), where N is an integer higher than or equal to two;
- trapping a burst of N laser pulses (10) in said regenerative optical cavity;
- extracting said burst of N laser pulses of said regenerative optical cavity; and
- optically amplifying said burst of N laser pulses to form a burst of amplified laser pulses (20).

10. The system for generating a burst of laser pulses according to claim 2, wherein said injection means and said extraction means include a Pockels cell configured so as to be fully blocking between the injection of the pulse burst and the extraction of said pulse burst.

11. The system for generating a burst of laser pulses according to claim 2, wherein the regenerative optical cavity is a multi-passage cavity and wherein the amplifying medium is arranged in said multi-passage regenerative optical cavity so that one pulse of the pulse burst performs a plurality of passages through the amplifying medium.

12. The system for generating a burst of laser pulses according to claim 3, wherein the regenerative optical cavity is a multi-passage cavity and wherein the amplifying medium is arranged in said multi-passage regenerative optical cavity so that one pulse of the pulse burst performs a plurality of passages through the amplifying medium.

13. The system for generating a burst of laser pulses according to claim 5, wherein the regenerative optical cavity is a multi-passage cavity including an optical system with mirrors (31, 32, 33, 34, 35, 36) arranged in such a manner that the beam incident on each of said mirrors (31, 32, 33, 34, 35, 36) is spatially offset at each passage in said multi-passage cavity.

14. The system for generating a burst of laser pulses according to claim 6, wherein the regenerative optical cavity is a multi-passage cavity including an optical system with mirrors (31, 32, 33, 34, 35, 36) arranged in such a manner that the beam incident on each of said mirrors (31, 32, 33, 34, 35, 36) is spatially offset at each passage in said multi-passage cavity.

15. The system for generating a burst of laser pulses according to claim 7, wherein the regenerative optical cavity is a multi-passage cavity including an optical system with mirrors (31, 32, 33, 34, 35, 36) arranged in such a manner that the beam incident on each of said mirrors (31, 32, 33, 34, 35, 36) is spatially offset at each passage in said multi-passage cavity.

* * * * *